July 21, 1970 T. J. CHINLUND 3,521,237

HIGH-SPEED DATA-DIRECTED INFORMATION PROCESSING SYSTEM

Filed May 11, 1967 4 Sheets-Sheet 1

INVENTOR
T. J. CHINLUND
BY Lucian C. Canepa
ATTORNEY

HIGH-SPEED DATA-DIRECTED INFORMATION PROCESSING SYSTEM

Filed May 11, 1967

4 Sheets-Sheet 4

United States Patent Office 3,521,237
Patented July 21, 1970

3,521,237

HIGH-SPEED DATA-DIRECTED INFORMATION PROCESSING SYSTEM

Thomas J. Chinlund, Glen Ellyn, Ill., assignor to Bell Telephone Laboratories, Incorporated, Murray Hill, N.J., a corporation of New York

Continuation-in-part of application Ser. No. 572,822, Aug. 16, 1966. This application May 11, 1967, Ser. No. 637,789
Int. Cl. G06f *7/00*
U.S. Cl. 340—172.5 28 Claims

ABSTRACT OF THE DISCLOSURE

A general-purpose computer operates in a high-speed data-directed mode. The computer includes fast access registers for storing compactly encoded selection information signals that directly control the state of a program instruction location counter. By rapidly decoding the selection information, a determination is made in a small portion of each of successive computer cycles as to which instructions of stored sets of instructions are to be referenced by the counter for accessing, decoding and execution.

CROSS-REFERENCE TO RELATED APPLICATION

This is a continuation-in-part of my copending application Ser. No. 572,822, filed Aug. 16, 1966 and now abandoned.

FIELD OF THE INVENTION

This invention relates to the selective processing of information signals and more particularly to an improved information processing system characterized by a novel mode of operation designated the selective access mode.

DESCRIPTION OF THE PRIOR ART

Various types of known information processing systems of practical importance posses the capability to select and execute data-dependent subsets of general-purpose sets of instructions. In such systems, selection of the desired subset of instructions may, for example, be accomplished by a single relatively long master subroutine that includes a full or general-purpose set of instructions and, in addition, appropriate test and transfer instructions. In operation, a main program of the system calls the noted subroutine. Then, in cycling through the instructions of the subroutine, the system causes specified stored data to be referenced and tested. Depending on the results of these tests, certain instructions of the subroutine are in effect skipped over, while others are selected for execution. In this way, a particular desired subset of instructions is selected for execution during each run through the subroutine. By successive variations of the data to be tested, and in response to repeated calls to the master subroutine, the system is able to select different subsets of the general-purpose set of instructions. Each subset of instructions so selected may be any one of the various possible different combinations of instructions included in the full set.

Alternatively, information processing systems as heretofore constructed can be arranged to have stored therein a plurality of distinct relatively short subroutines which in effect represent some of the different possible subsets mentioned above. In accordance with this alternative arrangement, test and transfer instructions are included in the body of the main program itself. When a test instruction is encountered in the main program, the test is carried out and, depending on the nature of the data tested, a transfer is then made to a particular one of the plurality of distinct subroutines.

In prior art systems of the type described above, repeated accessing, decoding and execution of test and transfer instructions are obviously time consuming operations that may place severe limitations on the run-time capability of the system. In addition, it is apparent that actually storing many of the possible subsets of a full set of instructions may in a particular case be excessively wasteful of memory locations in the main store of the system.

SUMMARY OF THE INVENTION

Accordingly an object of the present invention is an improved information processing system.

More specifically, an object of this invention is an improved information processing system characterized by a high-speed data-directed mode of operation.

Another object of the present invention is an improved information processing system in which the amount of main memory space required to specify selected subsets of sets of general-purpose instructions is significantly reduced.

A further object of this invention is the efficient and compact encoding of algorithms involving data-dependent processing.

A still further object of the present invention is to make available at program run time the facilities of conditional compilation of instructions.

A further object of this invention is to enable the compact encoding of the attributes of various data types. Such attributes are typically used to specify the particular kind of processing to be associated with each data type. For example, a variable may be encoded in fixed, floating or character mode; or a data item may have several different accessing procedures associated with it.

A further object of this invention is to allow more compact encoding of simulation programs and command and control programs.

Yet another object of this invention is to enhance the instruction repertoire of an information processing system to provide the system with the equivalent in computing power of a larger, more complicated instruction set.

These and other objects of the present invention are realized in a specific illustrative computing embodiment thereof that includes a plurality of fast access registers for storing so-called selection information signals that determine which instructions of a stored general-purpose set of instructions are to be selected for accessing, decoding and execution. In the so-called selective access mode of operation characteristic of the invention, the contents of a particular selection register are gated into an associated unit designated a controlling selection register. A first portion of the information sequence stored in the controlling selection register is interpreted as specifying zero or more selected instructions of a general-purpose set. The remaining or second portion of the stored sequence is interpreted as specifying the next selection register whose contents are to be gated to the controlling selection register when the current selection information has been processed.

During selective access, decoding of the first portion of the sequence stored in the controlling selection register is carried out by circuitry that senses the nature of the signal stored in the highest-order bit position of the controlling selection register. If this signal is, say, a "1," a bit-mode cycle of operation is initiated. On the other hand, if the highest-order signal is determined to be a "0," a jump-mode cycle commences.

In bit-mode selective access, a control circuit is activated by the sensing or decoding circuitry to shift the bits of the first portion of the sequence stored in the controlling selection register into the highest-order digit position of that register in a sequential bit-by-bit manner. Any "0" signal encountered during this process results in the enabling of a store access decoder, whereby the instruction in main memory referenced by the current indication of the program instruction location counter is then accessed in a conventional manner. If, however, during the shifting process a "1" signal is encoutered in the bit stream stored in the controlling selection register, the contents of the program instruction location counter are incremented by one and the store access decoder is not enabled. In other words, the encountered "1" signal causes skipping of a particular associated instruction in the general-purpose set of instructions to which the selective access information stored in the controlling selection register corresponds. This skipping takes place in a small portion of a single machine cycle.

In jump-mode selective access, a subfield of the first portion of the information sequence stored in the controlling selection register is interpreted as a signed jump amount. Under specified conditions, this amount is algebraically added to the contents of the program instruction location counter and the instruction referenced by the incremented (or decremented) representation in the instruction location counter is then accessed in the usual way.

In accordance with the principles of the present invention, the bit-mode determination as to whether or not a particular instruction included in a full set of instructions is to be accessed or not is made in a high-speed manner at the very beginning (or end) of a machine cycle. If the particular instruction under consideration is to be accessed, such accessing, decoding and execution take place during the subsequent major portion of the same machine cycle. (However, if the determination is completed near the end of a cycle, accessing, decoding and execution may take place during the initial portion of the following cycle.) If accessing of the particular instruction is not indicated, subsequent sequential interrogation of the selection bits stored in the controlling selection register is carried out until a bit is encountered that signifies that the corresponding instruction is to be accesesd. Significantly, these sequential interrogations will normally take place during the initial (or final) portions of a single machine cycle. (The exception is a combination of a long string of "1" bits with an executed instruction that modifies the program instruction location counter near the end of a machine cycle. In case high-speed circuitry is used, this problem will not occur.) The number of full machine cycles required to execute a subset of the full set of instructions will normally correspond to the number of instructions included in the subset. In contrast to the prior art, additional machine cycles are rarely required to carry out test and transfer instructions. In accordance with the invention, the required test information is in effect stored in compact encoded form in the selection registers. High speed decoding of this information, with consquent rapid modification of the contents of the program instruction location counter, implements the necessary transfers in a unique way. No actual test or transfer instructions of the type required by the prior art need be included in the main program or in selectively accessed routines which the main program references nor need cycles be used up on suppressed operations. Accordingly, the space required in main memory to store a complete program is reduced considerably over the space required in comparable prior art systems, and the time required relative to alternate prior art systems is also considerably reduced.

In jump-mode operation, a prescribed condition may have to be met before the specified jump amount is algebraically added to the contents of the program instruction location counter. (Such conditions may also be required to be met in an alternative encoding of bit-mode selective access, as mentioned below.) If the condition is met, or if the jump is unconditional, the specified jump amount is gated to the instruction location counter, the store access decoder is enabled and the instruction referenced by the updated contents of the instruction location counter is accessed, decoded and executed. If the condition is not met, the jump amount is not gated to the instruction location counter. In this later case, enabling of the store access decoder results in the accessing of the instruction referenced by the current (unchanged) representation stored in the instruction location counter.

It is a feature of the present invention that an information processing system include a plurality of high-speed selection registers for storing encoded sequences that are used to control the selective accessing of program-determined subsets of program instructions stored in a main memory.

It is a further feature of this invention that the sequence stored in a particular referenced one of the selection registers be applied to a controlling selection register the initial contents of whose highest-order bit position determines whether the sequence is to be interpreted as specifying a bit-mode or a jump-mode cycle of operation.

It is another feature of the present invention that a decoder be connected to the controlling selection register for enabling a bit-mode control circuit in response to the initial contents of the highest-order bit position of the controlling selection register being one specified binary value and for enabling a jump-mode control circuit in response to the noted contents being the other binary value.

It is still another feature of this invention that enabling of the bit-mode control circuit cause bit-by-bit shifting through a first portion of the controlling selection register of the sequence stored therein, with the successive contents of the highest-order bit position of that register being tested by the decoder.

It is yet another feature of the present invention that in the bit mode of operation the decoder respond to the successive binary values stored in the highest-order bit position by the controlling selection register by enabling a store access decoder only if the bit stored in the noted position is detected to be of a specified binary character.

Another feature of this invention is that in bit-mode operation the decoder respond to binary signals of the other binary value by sending an incrementing signal to the instruction location counter as soon as the decoder has determined the nature of the signal, the instruction location counter being arranged to accept such signals as they arrive from the decoder.

A still further feature of this invention is that the bit-mode control circuit insert binary signals of a predetermined nature into the lowest-order bit position of the first portion of the controlling selection register as the sequence stored therein is successively shifted therealong in the bit-mode.

Another feature of the present invention is that the bit-mode control circuit successively test the character of the first portion of the sequence stored in the controlling selection register to determine whether or not all the representations of the portion are of the noted predetermined nature, and that the bit-mode control circuit signal a termination of the bit-mode cycle when all the bits stored in the first portion of the controlling selection register are of the same predetermined nature.

Yet another feature of this invention is that the jump-mode circuit controls (in a conditional or unconditional way) the application of the contents of specified bit positions of the controlling selection register to a program instruction location counter to cause the contents of the counter to be incremented (or decremented) by a specified jump amount.

BRIEF DESCRIPTION OF THE DRAWING

A complete understanding of the present invention and of the above and other objects, features and advantages thereof may be gained from a consideration of the following detailed description of a specific illustrative embodiment thereof presented hereinbelow in connection with the accompanying drawings, in which.

DETAILED DESCRIPTION

Figure 1A:
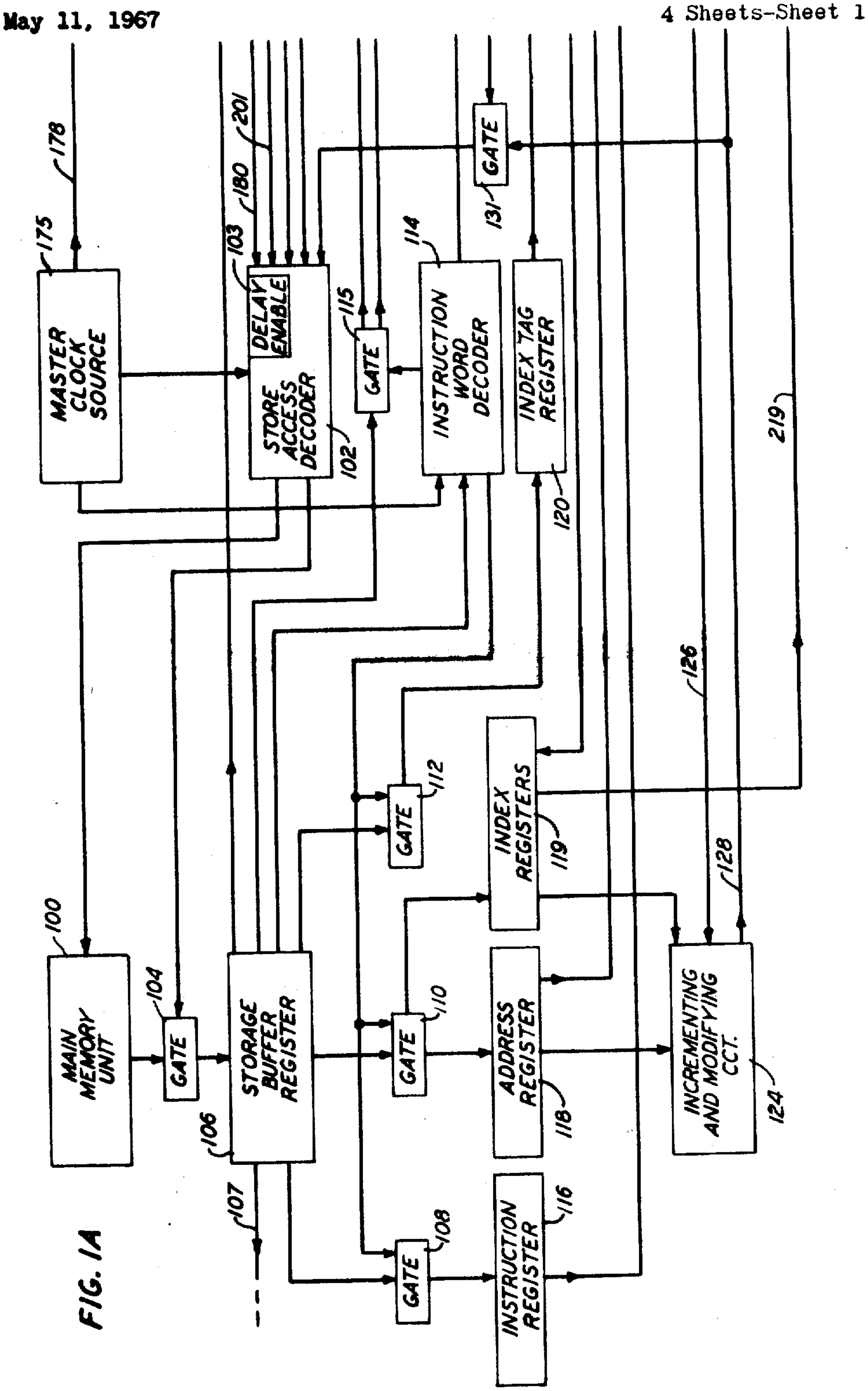
FIGS. 1A, 1B and 1C, when placed side-by-side in the particular manner indicated in FIG. 2, depict a specific illustrative stored-program information processing system made in accordance with the principles of the present invention.
Figures 1B, 2:
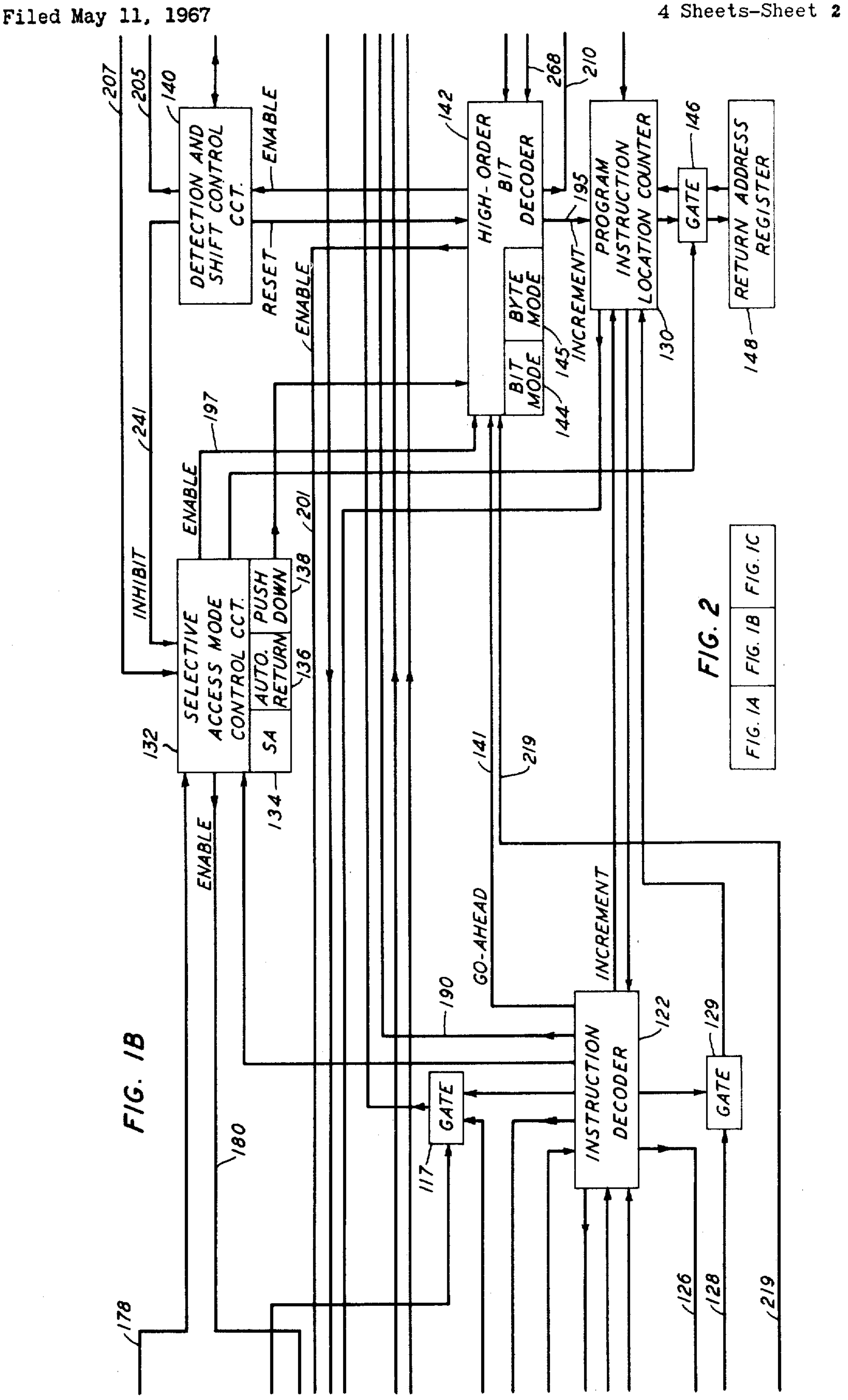
Figure 1C:
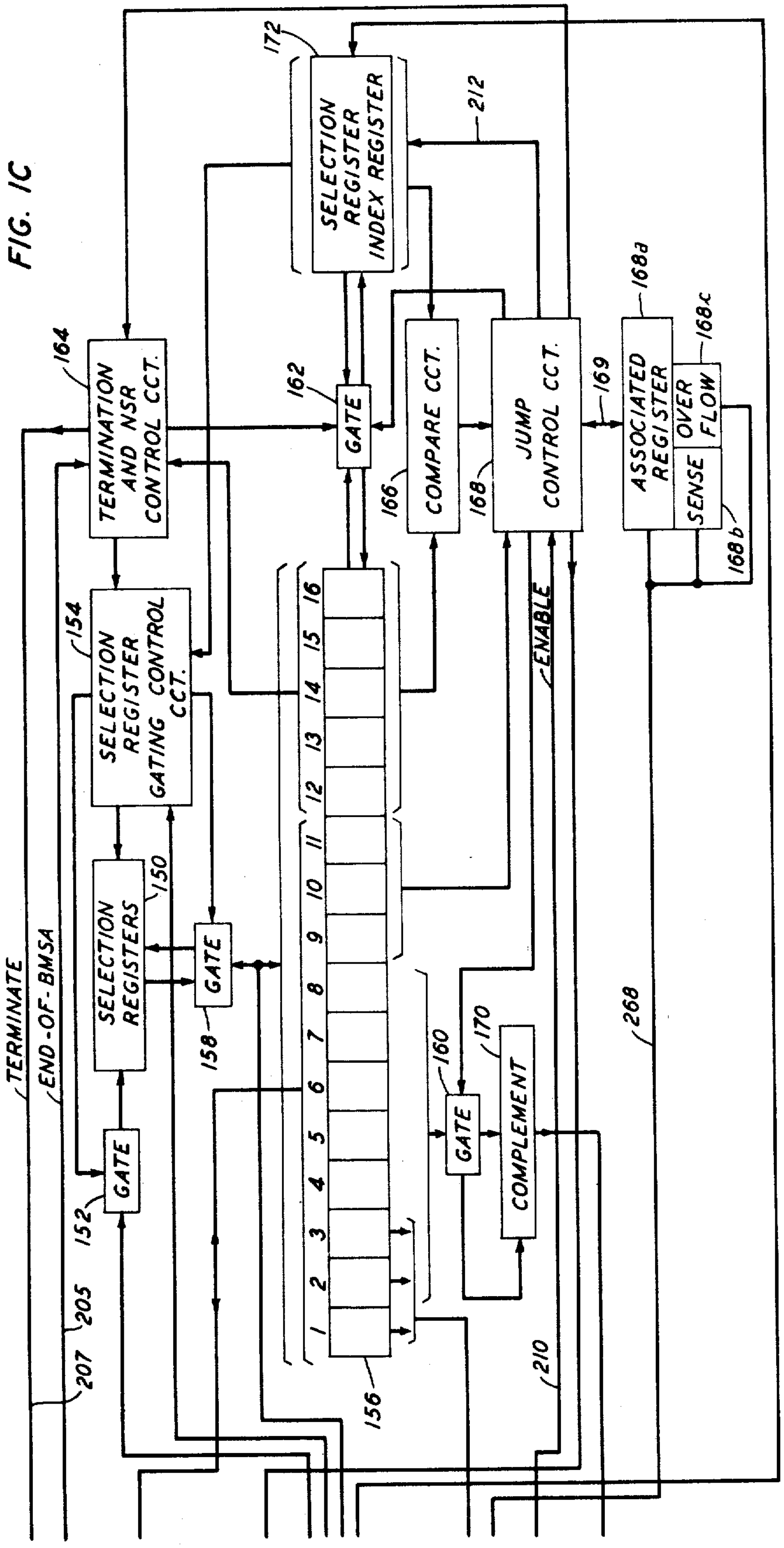

The FIG. 1A portion of the specific illustrative information processing system shown in FIGS. 1A, 1B and 1C includes an addressable main memory unit 100 of the random access type. The unit 100, which may, for example, be a conventional magnetic core memory, is adapted to have stored therein a plurality of multidigit binary numbers which may constitute data representations or instruction words. Access to a particular one of the stored numbers is accomplished by applying the address of the particular number to a store access decoder 102. When activated, the decoder 102 is effective to access a particular number stored in the unit 100 and to cause that number to be gated (via a gate unit 104) to a storage buffer register 106. Under the control of enabling signals applied to gates 108, 110 and 112 from an instruction word decoder 114, selected portions of a number temporarily stored in the buffer register 106 may be respectively gated to an instruction register 116, an address register 118 and an index tag register 120. In addition, the decoder 114 controls the application of information numbers directly from the buffer register 106 via gates 115 (FIG. 1A) and 117 (FIG. 1B) to later-describe the components of the illustrative system.

The contents of the instruction register 116 shown in FIG. 1A are applied to an instruction decoder 122 (FIG. 1B). The contents of the address register 118 are applied to an incrementing and modifying circuit 124 in which the address representation contained in the register 118 may be modified in accordance with the contents of a referenced one of a plurality of index registers 119 or incremented in response to signals applied to the circuit 124 from the decoder 122 via a lead 126. In turn the output of the circuit 124 is applied via a lead 128 and a gate 129 to a program instruction location counter 130 shown in FIG. 1B. Also the output of the circuit 124 is applied to a gate 131 whichis controlled by the decoder 122 to apply the address of the operand portion of an instruction word to the decoder 102. In that way a data word may be retrieved from the memory unit 100 and gated to the storage buffer register 106. Thereafter the retrieved data may be applied from the register 106 via a lead 107 to other conventional components of a computing or data processing system, including the index registers 119.

The individual system components shown in FIGS. 1A and 1B and described so far are conventional in nature. Furthermore, the interconnections among these particular components, as well as their overall mode of operation, are also conventional. In structure and function these components may, for example, be identical to the corresponding units included in the general-purpose stored-program computer described in J. L. Brown Pat. 3,036,-773, issued May 29, 1962. Alternatively, these components may be structured in accordance with the teachings contained in a copending application, Ser. No. 334,875, filed Dec. 31, 1963 in the names of A. H. Doblmaier, R. W. Downing, M. P. Fabisch, J. A. Harr, H. F. May, J. S. Nowak, F. F. Taylor and W. Ulrich.

Referring again to FIG. 1B, there is shown a selective access mode control circuit 132 which includes three indicators: a selective access (SA) flip-flop 134, an automatic return flip-flop 136 and a push-down flip-flop 138. Also shown in FIG. 1B are a detection and shift control circuit 140, a high-order bit decoder 142 which includes a bit-mode flip-flop 144, a gate 146, and a return address register 148.

FIG. 1C depicts a block 150 which represents a plurality of high speed, fast access selection registers. For illustrative purposes herein it will be assumed that the block 150 includes thirty-one 16-bit registers. Binary sequences are applied to the registers 150 via a gate 152 that is controlled by a selection register gating control circuit 154. The circuit 154 also serves to identify the particular selection register to which a binary sequence is to be applied.

Binary sequences can be moved between the selection registers 150 and a 16-bit controlling selection register 156 (FIG. 1C) via a gate 158 which is also controlled by the selection register gating control circuit 154. (For ease of reference, the digit positions of the register 156 are numbered from 1 through 16.) Connected to the controlling selection register 156, hereinafter referred to as the CSR, are gates 160 and 162, a termination and NSR control circuit 164, a compare circuit 166 and a jump control circuit 168. In addition, a complement circuit 170 is connected to the gate 160, and a selection register index register 172 is connected to the gate 162.

Figure 3:
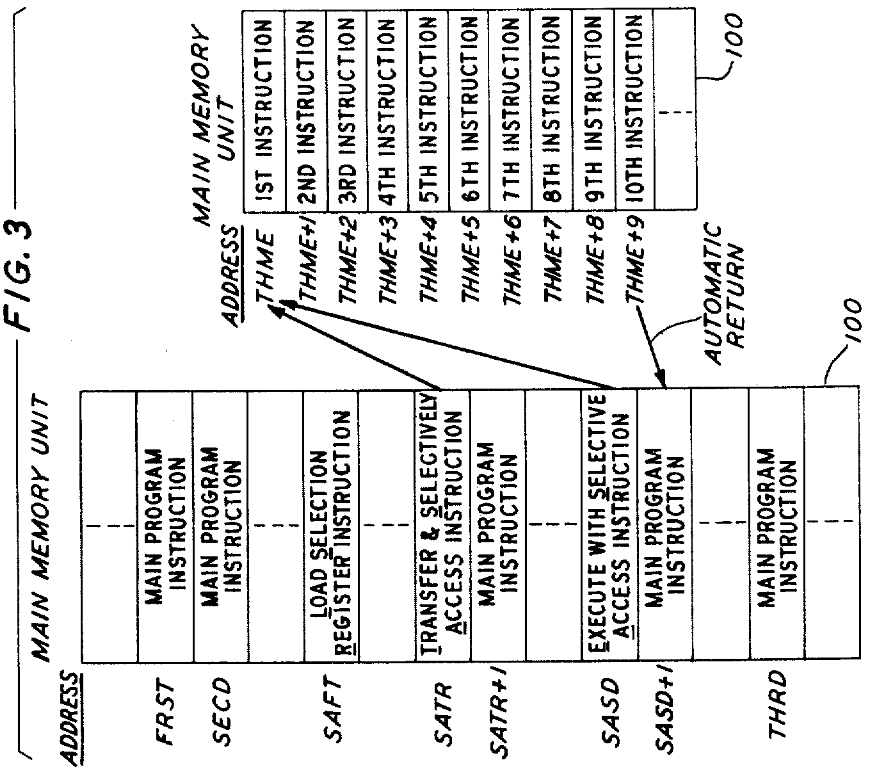
FIG. 3 is a symbolic representation of the contents of certain portions of a main memory unit included in FIG. 1A.

The mode of operation of the specific illustrative system shown in FIGS. 1A, 1B and 1C can best be described with the aid of FIG. 3. The left- and right-hand blocks in FIG. 3 represent two different sections of the main memory unit 100 shown in FIG. 1A. The left-hand section contains the so-called main program and has stored therein what may be regarded as conventional main program instructions of a type that would typically be encountered in the operation of a stored-program computer. These conventional instructions are stored in the left-hand block of FIG. 3 at the memory addresses designtaed FRST, SECD, SATR+1, SASD+1 and THRD. In accordance with the principles of the present invention the left-hand block also has stored therein instructions which are unique to the selective access mode of operation to be described in detail herein. The nature and effect of these latter instructions, which are stored at the memory addresses designated SAFT, SATR and SASD, will be described later below.

The right-hand memory block shown in FIG. 3 has stored therein, commencing at the memory address designated THME, a plurality of instructions which constitute a general-purpose set of instructions. As is well known to those skilled in the art of programming information processing systems, it is often necessary in effect to repeatedly specify particular subsets of instructions of general-purpose sets of instructions. Each such subset or variant of a general-purpose set comprises selected instructions of the set. Thus, for example, a particular desired subset of instructions may include the first, third and tenth instructions of the set represented in the right-hand block of FIG. 3. Another desired subset thereof may, illustratively, include only the first, second and fourth instructions, and so forth. A transfer from the main program to the general-purpose set of instructions is effected by a selective access transfer instruction of a type to be described below. In turn, the particular instructions of the general-purpose set which are to be selected for accessing, decoding and execution are determined by the contents of the selection registers 150.

To illustrate the mode of operation of the specific system shown in FIGS. 1A, 1B and 1C, assume initially that the instruction location counter 130 contains therein the address FRST which is the location in the memory unit 100 of the first one of the main program instructions represented in the left-hand block of FIG. 3. The start of a complete system or machine cycle is then commenced by the application of a timing signal from a master clock source 175 to the selective access mode control circuit 132 via a lead 178. If the SA flip-flop 134 is not set (thereby indicating that the depicted system is not at the time in the selective access mode) the circuit 132 responds to the noted timing signal in a normal way by applying an enabling signal via a lead 180 to the store access decoder 102 which is also timed by the source 175. (The manner in which the SA flip-flop 134 is set and reset and the resulting mode of operation of the system if the flip-flop 134 is in its set condition, will be described later below.)

The enabling of the store access decoder 102 causes it to reference the particular location in the main memory unit 100 specified by the program instruction location counter 130. As indicated above, the counter 130 initially contains therein the representation FRST. Hence the decoder 102 accesses the number (instruction) stored at that address in the unit 100. Next the contents of FRST are gated to the storage buffer register 106 via the gate 104. Thereafter standard decoding and execution of the retrieved instruction are carried out by the instruction word decoder 114, the registers 116, 118, 119, 120 and the instruction decoder 122. Other conventional components such as, for example, accumulator and multiplier-quotient registers and adders (not depicted in FIGS. 1A, 1B and 1C) may be interconnected to and cooperate with the depicted system to execute the specified instruction in a straight-forward manner known in the art.

Accessing, decoding and execution of the subsequent main program instruction stored at the address designated SECD in FIG. 3 occur in a manner identical to that described above. Eventually the instruction stored at the address SAFT is encountered. This instruction is directed to loading one of the selection registers 150 (FIG. 1C) with a specified data representation. Other ways of loading those registers will be specified below.

A simple example of an illustrative LSR instruction is as follows:

LSR BITS, SEL REG NO. 6 (1)

The effect of such an instruction is to move the number which is stored in a 16-bit portion of the main memory unit 100 at the address designated BITS into selection register No. 6 of the thirty-one selection registers 150. The illustrative system accomplishes this operation in a straightforward manner by (1) applying the designator or index 6 from the instruction decoder 122 to the selection register gating control circuit 154 via a lead 190, and (2) applying the actual number stored at BITS to the indexed selection register (No. 6) in the block 150 via the gates 117 and 152.

Many forms of load instruction are included within the scope of this invention, namely, all those conventionally used to load and modify registers in digital computers. In particular, load instructions which involve the usual arithmetic and logical functions are so included.

Assume for purposes of a specific example that the following 16-bit sequence whose digits are numbered as shown below is loaded into selection register No. 6 in response to the execution of instruction (1) above.

(2)

| Bit position: | Bit value |
|---|---|
| 1 | 1 |
| 2 | 1 |
| 3 | 1 |
| 4 | 0 |
| 5 | 0 |
| 6 | 0 |
| 7 | 1 |
| 8 | 0 |
| 9 | 1 |
| 10 | 0 |
| 11 | 1 |
| 12 | 0 |
| 13 | 0 |
| 14 | 1 |
| 15 | 1 |
| 16 | 1 |

The left-most digit position of this 16-bit sequence, and of each of the other numbers stored in the selection registers 150, will be assumed to contain a so-called mode indicator bit. For illustration, a "1" representation in digit position No. 1 will be interpreted in the selective access mode of operation as specifying a bit mode of operation. (A "0" signal stored in that digit position will signify a jump mode of operation.) In bit-mode selective access (BMSA) the next 10 bits of the sequence stored in a selection register are interpreted as constituting the selection field thereof. (In jump-mode selective access these same 10 bits are interpreted in a different way, to be described in detail below.) In BMSA (and also in jump-mode selective access) the last 5 digit positions, namely those numbered 12 through 16, specify the number of the next selection register in the block 150 to be referenced. For this reason the right-hand 5-bit portion of the sequence stored in a selection register is referred to herein as the NSR field of the selection register representation.

In the simplest BMSA case, the individual binary digits of the 10-bit selection field bear a one-to-one correspondence with a set of general-purpose instructions. (Such correspondence will follow transfers, as described below.) In this case the nature of each digit in the selection field determines whether or not the corresponding instrument of the set is to be accessed or not. For example, a "0" indication is interpreted to mean that the corresponding instruction is to be accessed, whereas a "1" indication is interpreted to mean that the corresponding instruction is not to be accessed. (Other BMSA encodings are described below.)

BMSA will be better understood by following through in detail a specific illustrative example thereof. Continuing down the listing depicted in the left-hand block of FIG. 3, assume that selection register No. 6 has been loaded with the representation (2) above and that the instruction stored at the address designated SATR has been reached in the course of normal instruction-by-instruction operation of the system shown in FIGS. 1A, 1B and 1C. The instruction stored in the memory unit 100 at SATR is a transfer and selectively access (TSA) instruction of the type encompassed within the principles of the present invention. Assume that the TSA instruction stored at SATR has the following illustrative format:

TSA THME, INDEX TAG (optional), SEL REG NO. 6 (3)

As will be set forth in detail immediately below, the effect of instruction (3) is to place the system in the selective access mode and to transfer system control to the instruction whose location in the unit 100 is designated THME (see right-hand block of FIG. 3). Then instructions are accessed or not beginning at THME only if the respective bits in the selection field of the specified selection register (No. 6) are "0's."

Assume that the program instruction location counter 130 has stored therein the address SATR. The next machine cycle commences with the application of a timing signal from the source 175 to the selective access mode control circuit 132. At this point the SA flip-flop 134 has not yet been set. Hence, in the manner described above in connection with the retrieval of a conventional main program instruction, the store access decoder 102 is activated to reference the instruction stored at SATR. Subsequent retrieval and decoding of instruction (3) above cause the following actions to take place:

(1) The SA flip-flop 134 is set, thereby to indicate that a selective access instruction has been encountered.

(2) The present indication (SATR) of the instruction location counter 130 is incremented by one (to the representation SATR+1) and then gated to the return address register 148 wherein it is stored for possible future referencing in connection with a programmed return to a location near SATR+1 in the main program.

(3) The instruction location counter 130 is set to the in the indication THME.

(4) The instruction word decoder 114 causes the specified selection register number 6, to be gated via the gate 115 to the selection register index register 172. The instruction decoder 122 applies a signal to the selection register gating control circuit via the lead 190 to cause the contents of selection register No. 6 (i.e., the selection register whose number is in the selection register index register 172) to be gated via the gate 158 to the controlling selection register 156. Alternatively, and in addition to the above-described loading of the selection register index register 172, the indicator 6 may be applied directly from the instruction decoder 122 to the selection register gating control circuit 154 to cause the contents of selection register No. 6 to be applied via the gate 158 to the controlling selection register 156. In either case, the 16-bit sequence shown in (2) above is transferred to the CSR 156.

The next machine cycle commences with the application of another timing signal to the selective access mode control circuit 132. Since at that time the SA flip-flop 134 is set, this next cycle is sensed by the illustrative machine as being a selective access cycle. The set flip-flop 134 inhibits the circuit 132 from directly enabling the store access decoder 102. Instead the circuit 132 enables the high-order bit decoder 142 via a lead 197, whereby the "1" signal stored in the left-most digit position of the CSR 156 is sensed and decoded by the decoder 142. (This enable signal is effective only if the bit-mode flip-flop 144 is in its reset condition.) This "1" signal signifies a bit-mode selective access cycle. In response to the "1" signal, the decoder 142 sets the bit-mode flip-flop 144 and enables the detection and shift control circuit 140. In turn, the circuit 140 causes the sequence stored in digit positions 1 through 11 of the CSR 156 to be shifted one digit position to the left. At the same time, the circuit 140 inserts a "1" representation into the right-most digit position (No. 11) of the selection field of the CSR 156. The sequence then stored in digit positions 1 through 11 of the CSR 156 is as follows:

(4)

| | | | |
|---|---|---|---|
| 1 | 1 | 7 | 0 |
| 2 | 1 | 8 | 1 |
| 3 | 0 | 9 | 0 |
| 4 | 0 | 10 | 1 |
| 5 | 0 | 11 | 1 |
| 6 | 1 | | |

Next, the circuit 140 checks the sequence stored in digit positions 1 through 11 of the CSR 156 to determine whether or not an all-one representation is contained therein. If it is, termination of the selective access mode is initiated in the specific manner to be described later below. However, in the particular example being considered herein, the sequence stored in the noted digit positions is seen to be initially other than an all-one sequence. Hence, selective access operation continues.

The 10 bits stored in digit positions 1 through 10 of representation (4) are considered to respectively correspond to the first 10 instructions referenced by the instruction location counter 130 in the right-hand memory block shown in FIG. 3. (Note that this correspondence will "follow" transfers. That is, if any of the selected instructions in the THME block is a transfer, selective access will continue at the transferred-to address.) As mentioned above, a "1" indication signifies that the corresponding instruction is to be skipped, whereas a "0" indicates that the corresponding instruction is to be accessed, decoded and executed. Accordingly, the "1" indication stored in digit position No. 1 of representation (4) is interpreted by the decoder 142 as a skip signal for the instruction stored at the address designated THME. Skipping is accomplished by the decoder 142 applying an incrementing signal via a lead 195 to the program instruction location counter 130. In response to this incrementing signal the address representation stored in the counter 130 is incremented to the value THME+1, which is the location of the second instruction stored in the right-hand block of FIG. 3. While the counter 130 is being incremented, another shifting, inserting and detecting cycle is taking place. Since this incrementing is always by one, the counter 130 will be ready to accept a new incrementing signal as soon as the lowest-order bit position has been incremented and has propagated its carry signal, if any. The sequence then stored in digit positions 1 through 11 of the CSR 156 is:

(5)

| | | | |
|---|---|---|---|
| 1 | 1 | 7 | 1 |
| 2 | 0 | 8 | 0 |
| 3 | 0 | 9 | 1 |
| 4 | 0 | 10 | 1 |
| 5 | 1 | 11 | 1 |
| 6 | 0 | | |

The "1" signal stored in digit position No. 1 of representation (5) corresponds to the second instruction (stored at THME+1) in the right-hand block of FIG. 3. This "1" or skip indication causes incrementing of the number contained in the instruction location counter 130, in exactly the same manner described above. Hence the counter 130 is stepped to THME+2 and the circuit 140 is controlled to initiate another shifting, inserting and detecting cycle. The representation then stored in digit positions 1 through 11 of the CSR 156 is:

(6)

| | | | |
|---|---|---|---|
| 1 | 0 | 7 | 0 |
| 2 | 0 | 8 | 1 |
| 3 | 0 | 9 | 1 |
| 4 | 1 | 10 | 1 |
| 5 | 0 | 11 | 1 |
| 6 | 1 | | |

The "0" signal stored in digit position No. 1 of representation (6) corresponds to the third instruction (stored at THME+2) in the right-hand block of FIG. 3. This "0" signal signifies that the third instruction is to be accessed, decoded and executed. This action is initiated by the decoder 142 applying an enabling signal to the store access decoder 142 via a lead 201. The decoder 102 may include a delay-enable flip-flop 103. If this flip-flop 103 has been set by the master clock source 175 (as described below) accessing of the referenced instruction is delayed until the beginning of the next machine cycle. (As specified below, such delay will not usually occur.) After the application of the noted enabling signal, the decoder 102 references the particular address in the main memory unit 100 which is specified by the program instruction location counter 130. As stated above, the counter 130 has the representation THME+2 stored therein at that point in the overall cycle of operation. Hence, the instruction stored at THME+2 is accessed. Decoding and execution thereof follow in a straightforward manner, as described above. Note that if this instruction is a successful transfer, the appropriate address will be placed in the program instruction location counter 130, and selective access will continue from that new point.

It is emphasized that all of the selective access operations described above occur during a single machine cycle unless the delay-enable flip-flop 103 is set. The shifting, inserting and interrogating of bits in the CSR 156, and the specified incrementing of the program instruction location counter 130, occur in a high-speed manner during a relatively short initial portion of that cycle (and sometimes during a short final portion of the cycle, as described below). Once a bit is encountered in the CSR 156 indicating that a particular instruction of the referenced general-purpose set of instructions is to be accesed, a major portion of the machine cycle remains for actual accessing, decoding and execution of the instruction.

It is noted that with certain combinations of flip-flop setting times and machine cycle times, a long (more than 5 or 6) string of "1" bits may result in taking up too much time to accomplish accessing, decoding and executing of a machine instruction within the remaining portion of a cycle. To construct a selective access machine under such conditions, the delay-enable flip-flop 103 is advantageously included in the store access decoder 102. This flip-flop is set and reset by clock pulses and its output is combined with the enabling signal from the high-order bit decoder 142 in such manner as to delay accessing until the beginning of the next machine cycle.

To the extent that such delays are needed, the one-to-one correspondence between cycles and selected instructions will not hold. It is noted, however, that proper programming use of bit-mode selective access will result in relatively few such long strings of consecutive "1's." Thus, the number of necessary one-cycle delays is as a practical matter quite small. It is also noted that fast flip-flop setting times will obviate the need for such delay.

Advantageously, some parallel operation may be introduced in the specific system described herein. For example, as soon as an instruction's effect on the program instruction location counter 130 has been established, the instruction decoder 122 may send a "go ahead" signal via a lead 141 to the high-order bit decoder 142, thus saving time on those instructions that cause little modification of the program instruction location counter 130. This signal is effective only if the bit-mode flip-flop 144 is set. In other words, by means of the go-ahead signal, the high-order bit decoder 142 and the detection and shift control circuit 140 are able to do part of their work during the last part of a machine cycle. Such work will be typically accomplished as follows: Assume that during bit-mode selective access an instruction is being executed that requires a lengthy computation (e.g., a long addition) involving some general register(s). Further assume, for example, that such an instruction requires only simple incrementing of the program instruction location counter 130. Then the instruction decoder 122 will send the noted signal via the go-ahead lead 141 to enable the high-order bit decoder 142. Thus, without waiting for the beginning of the next cycle, decoding of selection information continues. The delay-enable flip-flop 103 will delay access to the unit 100 until the next cycle in the event the high-order bit decoder and the detection and shift control circuit complete their work before the end of the current cycle. This will occur if there are relatively few consecutive "1's" to be decoded.

By the beginning of each subsequent BMSA machine cycle, a signal has been applied from the instruction decoder 122 to the high-order bit decoder 142 via the lead 141. If the decoder 142 receives an enabling signal from the selective access mode control circuit 132 (by a signal on the lead 197), and if, in addition, the bit-mode flip-flop

144 is in its set condition, the decoder 142 is thereby controlled to continue operation in the bit mode, (The decoder 142 has been activated by the end of the previous cycle, as noted above.) In other words, the decoder 142 is thereby able to recognize that a previously-initiated bit-mode cycle is still in progress. In that way the signal stored in the left-most digit position of the CSR 156 is not interpreted by the decoder 142 as indicative of either a bit-mode or jump-mode cycle.

In two subsequent successive BMSA machine cycles, the "0" bits shown in digit positions 2 and 3 of representation (6) are respectively decoded. These bits prescribe in effect that the instructions stored at the addresses designated THME+3 and THME+4 be accessed. Relating representation (6) to the right-hand block of instructions in FIG. 3 an to the mode of operation described herein, it is evident that in the next subsequent machine cycle the instruction at THME+5 is skipped and the instruction at THME+6 is accessed. Similarly, in the next machine cycle the instruction at THME+7 is skipped and the instruction at THME+8 is accessed. The representation then stored in digit positions 1 through 11 of the CSR 156 is:

(7)

| | | | |
|---|---|---|---|
| 1 ---------------- | 0 | 7 ---------------- | 1 |
| 2 ---------------- | 1 | 8 ---------------- | 1 |
| 3 ---------------- | 1 | 9 ---------------- | 1 |
| 4 ---------------- | 1 | 10 ---------------- | 1 |
| 5 ---------------- | 1 | 11 ---------------- | 1 |
| 6 ---------------- | 1 | | |

It is re-emphasized that in the event any of the executed instructions is a transfer, the addresses THME+1, et cetera, will be changed by the transfer in the usual way.

Finally, during the beginning portion of the next machine cycle, the "1" signal shown in representation (7) as being stored in digit position No. 2 of the CSR 156 is shifted into the left-most digit position and another "1" signal is inserted into digit position No. 11. At that point in the cycle the circuit 140 detects the existence of an all-one sequence in digit positions 1 through 11 of the CSR 156. In response to this all-one condition, the circuit 140 applies a reset signal to the bit-mode flip-flop 144 and and end-of BMSA signal to the termination and NSR control circuit 164 via a lead 205. In addition, an inhibit signal is sent by the circuit 140 via a lead 241 to the selective access mode control circuit 132 to prevent the sending of an enable signal over the lead 197. This inhibit signal is effective while termination of selective access or gating of the new selection register contents is taking place. The purpose of the inhibit signal is to prevent enabling of the high-order bit decoder 142 before selection register gating is complete or before the SA flip-flop 134 has been reset on termination (as described below).

In response to the noted end-of-BMSA signal, the circuit 164 reads the 5-bit sequence or NSR field stored in digit positions 12 through 16 of the CSR 156. If this sequence has the value 00000, selective access is to be terminated. In such a case termination is accomplished by the circuit 164 applying a terminating signal to the selective access mode control circuit 132 via a lead 207. In response to this signal the circuit 132 resets the SA flip-flop 134. In addition, if the automatic return flip-flop 136 is in its set condition (this flip-flop would have been set by an ESA-type instruction, to be described below), the circuit 132 gates the contents of the return address register 148 into the program instruction location counter 130. The flip-flop 136 is then reset. If the flip-flop 136 is not in its set condition, the contents of the counter 130 are left unchanged. Subsequently, the occurrence of the next timing signal from the source 175 initiates another machine cycle which, due to the SA flip-flop 134 then being in its reset condition, will be a conventional or normal cycle of the type described earlier above.

On the other hand, if the contents of the NSR field of the CSR 156 are determined by the circuit 164 to constitute a non-zero sequence, as it is, for example, in the illustrative sequence (2) set out above, the following actions take place. The circuit 164 gates the contents of the NSR section of the CSR 156 into the selection register index register 172. From the register 172 the NSR representation is applied to the selection register gating control circuit 154. In turn, the circuit 154 responds to the NSR respresentation to cause the contents of the particular selection register specified by the NSR field to be gated into the CSR 156. In representation (2) the NSR field specifies selection register No. 7. In this case the selective access mode control circuit 132 is not signaled to terminate selective access. Hence, upon the application of a subsequent timing signal to the circuit 132, another selective access machine cycle is initiated. In this next cycle, the determination as to which instructions of the general-purpose set are to be accessed is controlled by the new sequence stored in the CSR 156.

To further illustrate the nature of the selective access mode of operation, assume that the depicted system has responded to an NSR indication of 7 in representation (2) by gating the contents of selection register No. 7 into the CSR 156. To be specific, assume that as a result thereof the following 16-bit sequence is now stored in the CSR 156:

(8)

| | | | |
|---|---|---|---|
| 1 | 0 | 9 | 0 |
| 2 | 0 | 10 | 0 |
| 3 | 0 | 11 | 1 |
| 4 | 0 | 12 | 0 |
| 5 | 0 | 13 | 0 |
| 6 | 1 | 14 | 0 |
| 7 | 1 | 15 | 1 |
| 8 | 0 | 16 | 1 |

The next timing signal applied to the selective access mode control circuit 132 initiates another selective access machine cycle (since we are assuming that the SA flip-flop 134 is still in its set condition). At the beginning of this cycle the high-order bit decoder 142 is activated to sense the character of the bit stored in digit position No. 1 of representation (8). The "0" signal stored there is interpreted as specifying a jump-mode selective access (JMSA) cycle. In response to this "0" signal the decoder 142 enables the jump-control circuit 168 via a lead 210. As a result the circuit 168 gates the bits stored in digit positions 2 through 8 of the CSR 156 to the program instruction location counter 130. The bit in digit position No. 2 is interpreted as a sign bit. Illustratively, a "0" signal indicates that the number specified by the bits in digit positions 3 through 8 is to be added to the present contents of the counter 130. If addition is indicated, the specified number or jump amount is gated through the complement circuit 170 without alteration. A "1" signal in digit position No. 2 indicates that the noted number is to be subtracted from the contents of the counter 130. Subtraction is effected by the circuit 170 complementing the specified number before applying it to the counter 130 for combination with the present contents thereof. Note that the complementing is for the purpose of producing the 2's complement with respect to the maximum main memory address. The program instruction location counter 130 is assumed to count modulo this maximum address, as is usual.

The signed jump amount stored in digit positions 2 through 8 may be conditionally or unconditionally gated by the circuit 168 to the counter 130. In this connection, the signals stored in digit positions 9 through 11 of the SCR 156 constitute a so-called jump control code that specifies whether the jump is to be conditional or not. For example, this 3-bit field may specify that the indicated jump amount be applied to the counter 130 only if an associated register 168*a* (connected to the circuit 168 via a lead 169) contains a predetermined number. The jump control code may also have embodied therein information relative to the manner in which digit positions 12 through 16 (the NSR field) of representation (7) are to be interpreted and modified. By way of specific illustration the 8 different possible 3-bit jump codes may be respectively assigned the following interpretations.

(1) 000—Add jump amount to counter 130. Execute referenced instruction. Gate NSR field to register 172 for next selective access step.

(2) 001—Add jump amount to counter 130 only if NSR field not equal to contents of register 172. Execute referenced instruction. Gate NSR field to register 172. Add one to register 172 (by signal applied from circuit 168 via lead 212). Gate contents of register 172 back to NSR field.

(3) 010—Same as 001 code but subtract one instead of adding one.

(4) 011—Same as 001 code but omit equality test. Terminate selective access when NSR field contains 00000.

(5) 100—Same as 011 code but subtract one instead of adding one.

(6) 101, 110 and 111—Condition codes. Jump if contents of specified register are zero, non-zero or equal to contents of specified index register. In any case, gate NSR field to register 172 and activate termination and NSR control circuit 164.

In the specific illustrative system described herein, the instruction referenced by the counter 130 after jump-mode modification is subsequently accessed and executed. Alternatively, JMSA may be implemented simply to modify the counter 130, without subsequent accessing and execution of the instruction specified by the counter 130. This alternative renders the programming of certain operations, such as the loop traversal illustrated below, more effective. On the other hand, JMSA provides an efficient encoding for the selection of relatively few instructions in a selectively-accessed set. In other words, if relatively large skips are made in the selectively-accessed routine, the jump-mode encoding is more efficient than a bit-mode representation.

BMSA and JMSA may be combined in various different ways to carry out the selective accessing of a set of general-purpose instructions in a highly flexible data-dependent manner. For example, assume that a general-purpose set of instructions is to be iteratively traversed with a different subset of instructions being selected for accessing during each traversal. In accordance with the principles of the present invention, this type of operation can be easily carried out in an efficient high-speed way. Specifically, assume that selection registers 1 through 7 of the block 150 have been loaded with the particular bit sequences represented in the left-hand box of FIG. 4. The 10-bit selection fields of selection registers 1 through 5 specify in effect five different subsets of the general-purpose set of instructions stored in the right-hand box of FIG. 4 at the storage locations designated GLPE through GLPE+7. Thus, during the first run through the general-purpose set of instructions, in response to a TSA instruction that references location GLPE and selection register No. 1, the selection field 1010100011 stored in selection register No. 1 would result in the following instructions of the general-purpose set being selected for accessing:

GLPE+1
GLPE+3
GLPE+5
GLPE+6
GLPE+7 (9)

Selection, decoding and execution of the particular instructions included in subset (9) is accomplished as described above in connection with BMSA operation. Following execution of this subset, the contents of the NSR field of selection register No. 1 would result in the contents of selection register No. 6 being gated into the CSR 156 of FIG. 1C. This particular 16-bit sequence would be recognized by the decoder 142 as specifying a JMSA cycle. Specifically, a jump amount of −8 storage locations is specified by the noted sequence. As a result, the program instruction location counter 130 is set to GLPE−1 which is then executed. Then bit-mode selective access execution resumes at GLPE. Furthermore, the contents of the register 172 are applied to and stored in the selection register gating control circiut 154 as an indicator to direct subsequent storage of the contents of the CSR 156 back into the selection register block 150. Then the NSR field of the CSR 156 is gated to the register 172, incremented by one (to the value 00010) via the lead 212 and subsequently returned to the NSR field of the CRS 156. The value 00010 remains stored in the register 172. Thereafter the modified 16-bit jump-encoded sequence is gated from the CSR 156 to the selection register (No. 6) in the block 150 specified by the selection register gating control circuit 154. At that point in the cycle of operation the next selection register to be applied to the CSR 156 is specified by the contents (00010) of the register 172. As a result thereof the contents of selection register No. 2 are gated to the CSR 156. Then the instructions stored at GLPE through GLPE+7 are accessed as specified by the selection field of selection register No. 2. In accordance with that field the GLPE, GLPE+5 and GLPE+7 instructions of the herein-considered general-purpose set are accessed, decoded and executed.

Subsequently, the contents of selection register No. 6 are again gated into the CSR 156. In response thereto another jump of −8 storage locations (to GLPE−1) takes place. In addition, in exactly the manner described above, the NSR field of the contents of the CSR 156 is again incremented by one before the 16-bit sequence therein is returned to selection register No. 6.

Figure 4:
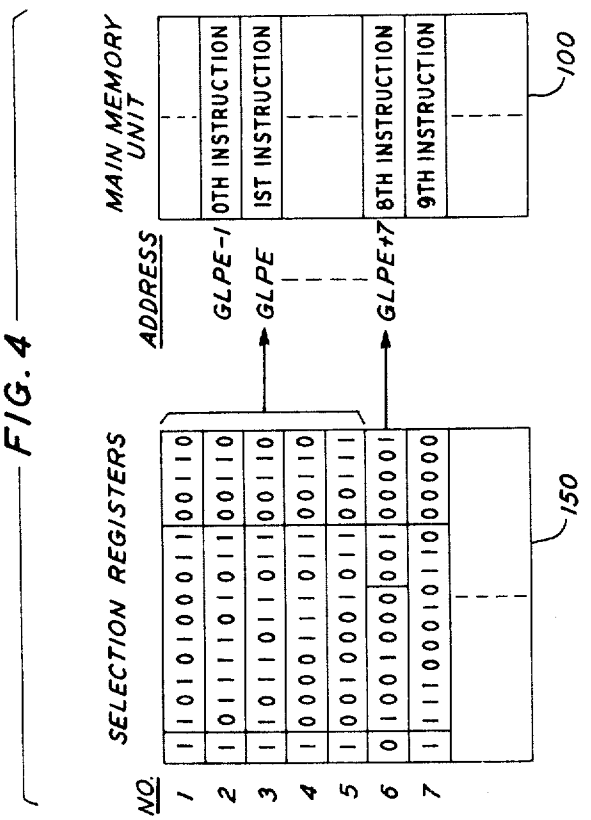
FIG. 4 illustrates the type of information that is stored in a set of selection registers included in FIG. 1C and, in addition, symbolically relates the registers to a specified section of the main memory.

Continued operation as specified above leads to successive selections of five different subsets of the general-purpose set of instructions stored in the right-hand box shown in FIG. 4. After interrogation of the selection field of selection register No. 5 has been completed, the NSR field thereof is tested. As seen from the left-hand box of FIG. 4, the value 7 (00111) is stored in that field. Hence the next selection register selected to be gated into the CSR 156 is selection register No. 7. In this way the looping operation described above ends and a transfer outside the loop is effected. Subsequently, after bit-by-bit interrogation of the selection field of the BMSA sequence stored in selection register No. 7, and in response to the 00000 representation stored in the NSR field thereof, the selective access mode of operation indicated in FIG. 4 is terminated. Alternatively, a 00000 in the NSR field of selection register No. 5 would cause immediate termination of selective access. If the automatic return flip-flop 136 had been set by an ESA instruction (see below), control would be returned to the calling address plus one. In the case of a TSA cycle of operation, a programmed return to the main program (possibly to the calling address plus one) may take place.

In the example set out above, it is to be noted that the 8th instruction of the GLPE block is executed on each loop. This is effected by the programming technique of having the 9th bit of each of selection registers 1, 2, 3, 4 and 5 equal to "0." This is a programming technique to ensure that the jump back caused by selection register No. 6 will always set the program instruction location counter 130 to location GLPE−1. Other techniques to achieve this include the execution of an appropriate transfer instruction in the selectively-accessed block.

On the other hand, a loop back to the same point might *not* be desired in each traversal. This possibility can be effected by having different bit positions of the several selection registers each contain the rightmost zero, or else by having different NSR fields reference different jump-encoded selection registers. Other programming techniques of this type are possible.

In accordance with the invention, it is possible that one of the instructions that is selected for accessing during BMSA or JMSA would itself be a TSA-type instruction. For example, during bit-by-bit interrogation of the selection field of a BMSA sequence stored in the CSR 156, reference may be made to a TSA instruction which references another block of general-purpose instructions. Typically, the contents of another selection register would be associated with the other block of instructions. In such a case the CSR 156 is reloaded with the contents of the other selection register, while the former contents of the CSR 156 may be saved for future use by a suitable store instruction. Alternatively, automatic saving of the CSR contents or the register 172 contents may take place in a special push-down register. To indicate the occurrence of such selective access operation within a selective access cycle, the mode control circuit 132 is adapted under these circumstances to set the push-down flip-flop 138. A subsequent termination of the second-level selective access is effective to reset the flip-flop 138. However, the SA flip-flop 134 remains set until the first-level selective access operation subsequently ends. Furthermore, a TSA instruction with a selection register index field of zero will cause the suspension of selective access. This is implemented as follows: If the instruction decoder 122 encounters a TSA instruction with a zero selection register index field, the decoder signals the selective access mode control circuit 132 to reset the SA mode flip-flop 134. Note that a TSA transfer back to a calling routine with a non-zero selection register index field would effect a resumption of selective access. The purpose of this feature is to enable a selectively-accessed routine to call a subroutine in normal mode.

As mentioned earlier above, the selection registers included in the block 150 of FIG. 1C may be loaded by means of an LSR instruction such as (1). In that case the TSA-type instruction need only specify which selection register is to be used to selectively control the mode of operation of the illustrative system. This type of TSA instruction is represented in (3).

However, there are alternative high-speed ways in which to load the selection registers 150. Illustratively, the bits of a specified selection register may be set according to the bits stored at an address given in the TSA instruction itself. Or specified bits of a particular selection register may be set in accordance with a bit format actually included in the TSA instruction.

The selective access type of instruction included herein may not necessarily include a transfer from the main program to a separate stretch of general-purpose instructions. Selective accessing may be controlled to occur with respect to a set of instructions included in the currently executing program itself. This may be done most compactly by having a selective access flag or option bit position set aside in the regular machine instruction formats. If an instruction is executed which has this bit position set, selective access commences at the current (post-execution) setting of the program instruction location counter. The current contents of the controlling selection register may be used for the initial stages of selective access. Or else, a longer option field in the regular instruction format could specify which selection register is to be gated to the CSR. This longer field need be interpreted as a selection register tag field only if the selective access flag is set, thus leaving the field open for other uses when the flag is not set.

The selective access flag position may be used to advantage during operation in the selective access mode. By having the instruction decoder 122 cause suspension of selective access whenever it decodes an instruction with the selective access flag reset to zero, it is possible to intersperse code that is to be executed in normal mode with code that is to be selectively accessed. This permits more compact encoding of selection information. (The mode control circuit 132 suspends selective access by resetting the SA flip-flop 134 while setting the push-down flip-flop 138. Subsequently, upon decoding of a program instruction with the selective access flag set, the mode control circuit sets the SA flip-flop and resets the push-down flip-flop. This enables selective access to continue at the current instruction location.)

An alternative way to access in-line code selectively is to execute a TSA to a nearby location.

An important feature of the selective access mode is that a return to a calling routine may be provided at extremely low additional cost. To this end, the automatic return flip-flop 136 is provided as part of the selective access mode control circuit 132. This flip-flop is set by instructions of the type execute with selective access (ESA). A typical such instruction might be:

ESA THME, INDEX TAG (optional), SELECTION REGISTER 3 (10)

Such an instruction is located, illustratively, in location SASD of FIG. 3. It would result in an eventual automatic return to SASD+1 as follows: This instruction has exactly the same effect as the TSA instruction described above, with the following additions: (a) On step (1) above, the automatic return flip-flop 136 is set. (b) On termination, as described above, the circuit 132 gates the contents of the return address register 148 into the program instruction location counter 130. The flip-flop 136 is then reset. The effect of this automatic return is to eliminate the need for the transfer-to-return address type of instruction that must otherwise occur in every subroutine. The function of this type of instruction is effectively fulfilled by the interpretation of the selection and NSR fields of the CSR 156.

Many other variations and modifications of the specific illustrative techniques described above are within the skill of the art. For example, the depicted system may be arranged to handle transfers back and forth within a set of consecutively-located general-purpose instructions that are being selectively accessed in bit mode. In this case, the CSR 156 would be a conventional shift and rotate register in which the contents thereof are preserved during shifting operations. Another alternative is to associate more than one bit of the selection field of the CSR 156 with each instruction of a general-purpose set of instructions. In such an alternative case a plurality of bits would correspond to each machine instruction and would specify one of $2^k$ possible modes of execution, where $k$ is the number of bits in the selection field corresponding to a single instruction. The various possible modes of execution include trapping modes, interrupt modes (any level), inhibit modes, input-output modes, core protect modes, and so forth. In general, this alternative encoding may be used to cause the accessing of instructions to be conditional on the states of devices included in or associated with the system. In addition to specifying mode flip-flops which might be tested as above, the $k$-bit code may specify that the incrementing of the program instruction location counter 130 is to take place only if an associated register or subregister or combination of registers contains a predetermined number or set of numbers. In other words, the $k$-bit selection field may specify tests of the kind commonly applied to machine registers under program control.

The connections between digit positions 2 and 3 of the CSR 156 and the high-order bit decoder 142, and between the decoder 142 and an associated register **168*a*, show one illustrative circuit arrangement for implementing $k$-bit operation when $k$ equals 3. In such a case the decoder 142 functions as a "byte" decoder, and the detection and shift control circuit 140 is adapted to shift the selection information in the CSR 156** $k$ bits at a time.

Byte decoding is initiated in one of two ways: Either the initial two bits of the controlling selection register 156 specify whether bit, byte or jump mode operation is to take place, or else a special field of the TSA and ESA instruction codes specifies these modes. In the first alternative, illustrated in the depicted system, the selection register 156 is decoded as follows: If the initial highest-order bit is "0," then jump mode selective access is enabled as described above. If the initial highest-order bit is "1," then the initial second bit position is also interrogated. If initially the second bit position is "0," bit mode selective access is enabled as described above, except that the controlling selection register contents are shifted left two places before BMSA begins.

If initially the second bit position is "1" (as well as the first), then conditional byte mode selective access is enabled as follows: A byte mode flip-flop 145 is set to "1." The controlling selection register contents are shifted left two positions. Then, for example, the current left-most three positions of the CSR 156 are read and the condition code found therein is interpreted, illustratively, as follows:

000—Access unconditionally.
001—Skip if associated register **168*a*** has "1" in sign bit position.
010—Skip if contents of specified index register are zero.
011—Skip if contents of specified index register are greater than contents of associated register.
100—Skip if sense flip-flop **168*b*** is set.
101—Skip if selective access push-down flip-flop 138 is set.
110—Skip if overflow flip-flop **168*c*** is set.
111—Skip unconditionally.

If the indicated skip condition is met, the program instruction location counter is stepped by "1" and accessing is inhibited. If the skip condition is not met, or if unconditional accessing is indicated, the instruction referenced by the program counter is accessed, decoded and executed.

In either case, the CSR 156 is shifted three places left under control of the circuit 140, and byte mode interrogation takes place again. Vacated positions on the right end of the selection field of the CSR 156 are set to "1," and termination takes place as described above for BMSA, except that the byte-mode flip-flop 145 is reset at the end of conditional byte mode selective access.

Another possible selection encoding encompassed within the principles of this invention is the following: The first $k$ bits (say, 3) of a selection register may indicate how many bits of such register shall be used for each selection step. This means, for example, that a selection register may be effectively divided into small bytes, each byte being used as a skip amount. In the above illustrated example, the "bytes" are of side one. Other encodings of selection information are possible, using coding techniques known in the art (for example, variable-length encodings).

Further extensions that come within the scope of this invention relate to obvious variants of the new kinds of instructions related to selective access. In particular, instructions may be devised for loading, modifying and storing selection registers in the ways that general-purpose registers are normally used in computers. Modifying selection registers according to the contents of any other registers of the machine, with the usual logical and arithmetic options, is especially useful. Also, indexed loading and multiple loading of selection registers are of use. Storing or saving selection register contents is also advantageous. Additional forms of transfer-and execute-with-selective-access include conditional, indirect and indexed transfers and executes.

The individual components included in the illustrative system described herein are conventional in nature. Direct counterparts of these components can be found in a general-purpose stored-program computer of the type described in the aforecited Brown patent or in an electronic switching system of the type described in the noted Doblmaier et al. application. The structure of the components shown in FIGS. 1A, 1B and 1C is considered, in view of the specific functional end requirements therefor set forth herein, to be clearly within the skill of the art. Alternatively, these components can be simulated in a straightforward way by suitable programming of a computer.

It is to be understood that the above-described arrangements are only illustrative of the application of the principles of the present invention. In accordance with these principles numerous other arrangements may be devised by those skilled in the art without departing from the spirit and scope of the invention. For example, separate instructions for loading the selection and next-selection-register fields are included within the scope of this invention. Illustratively, it is possible to achieve permuted orders of jump amounts and permuted orders of selection fields by varying the selection and NSR field contents using such load instructions.

Also, it is emphasized that the contents of selection registers may be modified by instructions that specify the bits of any register of the system and any logical or arithmetic function. For example, the quantity in the selection and/or NSR field of any selection register (or, alternatively, of the CSR) may be augmented by, multiplied by, AND-ed, OR-ed, complemented and EXCLUSIVE-OR-ed by the bits of any other registers of the system. The effect of this is to enable complete programmed modification of the selection information.

Furthermore selected portions of the inventive arrangements described herein may advantageously be independently implemented. Bit, byte or jump mode may be separately implemented to advantage for certain kinds of programming. The sizes of selection registers and of the various subfields may be modified, as can the number of registers used. In a straightforward way the inventive principles may also be embodied in multiprocessing systems and systems with several program location counters.

What is claimed is:

1. An information processing system adapted to access selected subsets of sets of instructions which are stored in a memory unit of said system, said system comprising,
- instruction location means capable of referencing said instructions in an instruction-by-instruction manner in successive system cycles,
- first means connected to said memory unit and responsive to the referencing of an instruction by said instruction location means for accessing the referenced instruction, including means for decoding and means for executing the referenced instruction,
- program-variable second means for registering a coded data representation which is independent of said sets of instructions but completely definitive of which of said stored instructions are to be selected for accessing, decoding and execution,
- and third means responsive to the representation contained in said second means for causing said instruction location means to respectively reference only the selected ones of said instructions in successive system cycles.

2. A system as in claim 1 wherein said second means comprises a multistage controlling selection register,
- said system further including a plurality of multistage selection registers,
- and first gating means connecting said selection registers to said controlling selection register.

3. A system as in claim 2 further including fourth means for loading said selection registers with specified multidigit data representations.

4. A system as in claim 3 further including fifth means for selecting the contents of a particular selection register for application to said controlling selection register via said first gating means.

5. A system as in claim 4 further including sixth means connected to the highest-order stage of said controlling selection register for decoding the data value stored therein.

6. A system as in claim 5 further including seventh means responsive to a determination by said sixth means that the data value initially stored in the highest-order stage of said controlling selection register is of a specified nature for activating a detection and shift control circuit which is connected to selected stages of said controlling selection register.

7. A system as in claim 6 further including eighth means responsive to a determination by said sixth means that the data value initially stored in the highest-order stage of said controlling selection register is of another specified nature for activating a jump control circuit which is connected to selected stages of said controlling selection register.

8. A system as in claim 7 further including ninth means controlled by said jump control circuit and connected to selected stages of said controlling selection register for applying the data values stored in said stages to said instruction location means.

9. A system as in claim 8 wherein said ninth means includes tenth means responsive to the data value stored in a particular one of said selected stages being of a specified nature for applying the data values in the remaining ones of said selected stages to said instruction location means in unaltered form and responsive to the data value stored in said particular stage being of another specified nature for applying the data values in the remaining ones of said selected stages to said instruction location means in complemented form.

10. A system as in claim 9 further including a selection register index register,
- a termination and next selection register control circuit,
- and second gating means controlled by said termination circuit and said jump circuit for applying the data values stored in specified stages of said controlling selection register to said selection register index register.

11. A system as in claim 10 further including eleventh means connected to said specified stages and to said selection register index register for comparing the respective contents thereof and for applying a signal indicative of the results of the comparison to said jump control circuit.

12. A combination as in claim 11 wherein said detection and shift control circuit is adapted to successively shift the data values stored in a selection field of said controlling selection register into the highest-order stage thereof,
- said combination further including twelfth means responsive to said sixth means detecting that the selection field data value that is shifted into said highest-order stage is of a predetermined nature for applying an incrementing signal to said instruction location means and responsive to said data value being of a different predetermined nature for applying an activating signal to said first means.

13. In combination in an information processing system that is adapted to selectively access a prescribed subset of a set of instructions stored in a memory unit,
- a program instruction location counter,
- a selective access mode control circuit including a selective access flip-flop, said circuit being responsive to a selective access instruction or a selective access field of an instruction having been retrieved from said memory unit for setting said flip-flop,
- an access decoder connected to said memory unit and adapted to be directly activated by said mode control circuit when said flip-flop is in its reset condition for referencing the particular instruction in said memory unit that is specified by said counter,
- first means connected to said mode control circuit and responsive to said flip-flop being in its set condition for controlling the stepping of said counter and the activation of said access decoder, and second means storing a coded data representation, which is independent of said sets of instructions, for controlling the operation of said first means.

14. In combination in an information processing machine, a program instruction location counter for referencing a memory unit, means for controlling the stepping of said counter without reference to said unit to determine the amount of such stepping, and program-variable means registering a coded compact data representation and connected to said controlling means for specifying whether said counter is to be stepped or not and, in the event that stepping is indicated, the amount of such stepping, whereby these controlling and stepping actions consume a sufficiently small portion of a cycle of said machine to allow for the accessing, decoding and execution of the instruction referenced by said counter in the balance of the machine cycle.

15. Apparatus adapted to execute a selected sub-set of a set of instructions stored in a memory unit, said apparatus comprising high-speed selection register means, means including said memory unit for applying selection code information, which is independent of said set of instructions, to said register means, an instruction location counter, decoding means responsive to the information stored in said register means for controlling said instruction location counter, without a reference to said memory unit, to reference selected ones of the instructions of said set, and means responsive to representations established in said instruction location counter for accessing said selected instructions, whereby said instructions are executed in successive cycles of said apparatus.

16. In combination, multistage controlling register means including a mode indicator stage, means responsive to said mode indicator stage storing a data representation of a predetermined nature for initiating interrogation by shifting the representations stored in a first set of said stages, and means responsive to said mode indicator stage storing a representation of a different predetermined nature for interpreting the representations stored in a second set of said stages as a signed jump amount.

17. A combination as in claim 16 further including a program instruction location counter controlled by said initiating and interpreting means.

18. A combination as in claim 17 wherein specified stages of said register means store a coded representation that references the location of another data sequence to be applied to said register means, and means controlled by said initiating and interpreting means and responsive to said coded representation for applying said other sequence to said register means.

19. In combination in an information processing system adapted to access a selected subset of a set of instructions which are stored in a memory unit of said system, a program instruction location counter adapted to accept an incrementing signal applied to the lowest-order bit position thereof as soon as a carry signal has been propagated to the next-higher-order-bit position, means for accessing instructions referenced by said counter, means connected to said unit for executing accessed instructions in successive system cycles, program-variable means for registering a coded representation which is independent of said set of instructions but completely definitive of the selected subset, means controlled by said program-variable means for stepping said counter, by applying thereto an incrementing signal, and enabling said accessing means, and means associated with said accessing means for delaying the enablement thereof until the beginning of the next subsequent system cycle if the enablement in the present cycle occurs beyond a predetermined time in the cycle interval.

20. A combination as in claim 19 wherein said delaying means includes a delay-enable flip-flop included in said accessing means, and a master clock source for cyclically setting and resetting said flip-flop at prescribed instants of time.

21. A combination as in claim 20 wherein said executing means includes means adapted to supply a go-ahead signal to said stepping and enabling means within the present system cycle as soon as any changes required to be made in the contents of the program instruction location counter within the present cycle have been made.

22. Apparatus adapted to selectively process a set of instructions stored in a memory unit, said apparatus comprising high-speed selection register means, means including said memory unit for applying selection code information, which is independent of said set of instructions, to said register means, said information comprising $k$ bits associated with each instruction of said set, and means responsive to the information stored in said register means for successively decoding the $k$-bit groups respectively associated with the instructions of said set and for accordingly processing each instruction of said set in one of $2^k$ possible modes.

23. Apparatus adapted to selectively process a set of program instructions stored in a memory unit, program instruction location counter means, means for storing selection information, means including said unit for applying selection information, which is independent of said set of instructions, to said storing means, said information comprising $k$ bits associated with each of said instructions for specifying in a conditional or unconditional way whether or not the associated instruction is to be accessed and executed and, in the event that accessing and execution are indicated, for specifying the mode of execution thereof, and decoding means responsive to the information contained in said storing means for controlling the operation of said program instruction location counter means and for specifying the mode of execution of each instruction referenced by said counter means.

24. In combination in an information processing system, program instruction location counter means, a main memory unit for storing a set of instructions which are to be selectively accessed, means storing selection information which is independent of said set of instructions, and means responsive to said stored selected information for testing any conditions specified thereby and for controlling said counter means to reference selected ones of said instructions if the respective selection thereof is specified to be unconditional or if the condition associated therewith is met.

25. Apparatus adapted to selectively process a set of program instructions stored in a memory unit, means for storing selection information which is independent of said set of program instructions to be processed, said information comprising a $k$-bit condition field associated with each different one of said instructions, and means successively responsive to each of said stored $k$-bit fields for testing any condition specified thereby and for referencing, accessing, decoding and executing the associated instruction if the condition is met of if no condition is specified.

26. In combination, a main memory for storing a set of instructions which are to be selectively accessed, register means for storing encoded conditional or unconditional selection information which is independent of said instructions, and decoding means responsive, without a reference to said main memory, to the information stored in said register means for each instruction for testing any condition specified therefor and, in the event such condition is met or if no condition is specified, for accessing the instruction if the selection information therefor so indicates.

27. Apparatus adapted to execute a selected subset of a set of instructions stored in a memory unit, said apparatus comprising high-speed controlling selection register means, means including said memory unit for applying selection code information, which is independent of said set of instructions, to said register means, said information comprising *k* bits assocated with each instruction of said set, an instruction location counter, means responsive to the information stored in said register means for successively decoding the *k*-bit groups respectively associated with the instructions of said set and for accordingly controlling said instruction location counter in an unconditional or conditional way, without a reference to said memory unit, to reference selected ones of the instructions of said set, and means responsive to representations established in said instruction location counter for accessing and executing said selected instructions in successive cycles of said apparatus.

28. Apparatus adapted to execute a selected one of a set of instructions stored in a memory unit, said apparatus comprising high speed selection register means, means including said memory unit for applying jump-mode selection code information, which is independent of said set of instructions, to said register means, an instruction location counter, and decoding means responsive to the information stored in said register means for controlling said instruction location counter, without a reference to said memory unit, to jump a specified amount to an indication which references a selected one of the instructions of said set, said decoding means including means responsive to a specified portion of the jump mode selection code information applied to said register means for determining whether said jump amount is to be unconditionally or conditionally applied to said counter and, in the event that said application is to be conditional, for determining whether or not the condition is met.

References Cited

UNITED STATES PATENTS

| | | | |
|---|---|---|---|
| 3,061,192 | 10/1962 | Terzian | 235—157 |
| 3,234,523 | 2/1966 | Blixt et al. | 340—172.5 |
| 3,239,820 | 3/1966 | Logan et al. | 340—172.5 |
| 3,241,125 | 3/1966 | Tomasulo et al. | 340—172.5 |
| 3,268,872 | 8/1966 | Kimlinger | 340—172.5 |
| 3,287,703 | 11/1966 | Slotnick | 340—172.5 |
| 3,297,997 | 1/1967 | Grady et al. | 340—172.5 |
| 3,331,056 | 7/1967 | Lethin et al. | 340—172.5 |

PAUL J. HENON, Primary Examiner

H. E. SPRINGBORN, Assistant Examiner